(12) United States Patent
Feinauer

(10) Patent No.: US 9,969,037 B2
(45) Date of Patent: May 15, 2018

(54) DUAL-SPINDLE MACHINING APPARATUS

(71) Applicant: EMAG Holding GmbH, Salach (DE)

(72) Inventor: Achim Feinauer, Goeppingen (DE)

(73) Assignee: EMAG HOLDING GMBH, Salach (DE)

( * ) Notice: Subject to any disclaimer, the term of this patent is extended or adjusted under 35 U.S.C. 154(b) by 94 days.

(21) Appl. No.: 14/790,551

(22) Filed: Jul. 2, 2015

(65) Prior Publication Data
US 2016/0023316 A1    Jan. 28, 2016

(30) Foreign Application Priority Data
Jul. 23, 2014   (DE) .................. 10 2014 011 040

(51) Int. Cl.
*B23Q 39/04*     (2006.01)
*B23P 23/02*     (2006.01)
*B23Q 1/01*      (2006.01)
*B23Q 39/02*     (2006.01)
*B23Q 39/00*     (2006.01)

(52) U.S. Cl.
CPC .............. *B23P 23/02* (2013.01); *B23Q 1/017* (2013.01); *B23Q 39/024* (2013.01); *B23Q 39/04* (2013.01); *B23Q 2039/002* (2013.01); *B23Q 2039/004* (2013.01); *B23Q 2230/008* (2013.01); *Y10T 29/49996* (2015.01); *Y10T 29/5114* (2015.01); *Y10T 29/5124* (2015.01); *Y10T 29/5135* (2015.01); *Y10T 29/5153* (2015.01)

(58) Field of Classification Search
CPC ....... B23P 23/02; B23Q 39/024; B23Q 1/017; B23Q 39/04; B23Q 2039/004; B23Q 2230/008; B23Q 2039/002; Y10T 29/5153; Y10T 29/5135; Y10T 29/49996; Y10T 29/5124; Y10T 29/5114
See application file for complete search history.

(56) References Cited

U.S. PATENT DOCUMENTS

2014/0326114 A1\* 11/2014 Hessbrueggen ....... B23Q 39/02
                                                        82/121

\* cited by examiner

*Primary Examiner* — John C Hong
(74) *Attorney, Agent, or Firm* — Andrew Wilford

(57) ABSTRACT

An apparatus for machining a workpiece has a housing having a vertical front wall and first and second side walls extending generally perpendicularly back from outer edges of the front wall, directed horizontally oppositely away from each other, and defining first and second planes themselves delimiting a space. First and second vertical guides on the first and second side walls outside the housing carry first and second vertical slides moveable vertically on the first and second vertical guides of the first and second side walls. First and second horizontal guides on the first and second vertical slides carry first and second horizontal slides movable horizontally on the first and second horizontal guides of the first and second vertical slides between the first and second front work stations and the first and second rear transfer stations.

5 Claims, 2 Drawing Sheets

DUAL-SPINDLE MACHINING APPARATUS

FIELD OF THE INVENTION

The present invention relates to an apparatus for machining a workpiece. More particularly this invention concerns such an apparatus that can drill, lathe, shape or otherwise machine workpieces one after the other.

BACKGROUND OF THE INVENTION

Copending U.S. patent application Ser. No. 13/431,173, which is incorporated herein by reference, describes a machining apparatus comprising a frame defining first and second upper machining stations horizontally offset from each other and respective first and second lower transfer stations underneath the first and second upper machining stations. Respective first and second spindles have respective first and second workpiece grabs and are displaceable vertically on the frame between upper positions with the respective first and second grabs in the respective first and second machining stations and lower positions with the respective first and second grabs in the respective first and second transfer stations. Respective first and second workpiece conveyors extend through the first and second transfer stations for transporting workpieces into and out of the respective transfer stations so that the respective spindles can pick up unmachined workpieces from the respective transfer stations and set machined workpieces down in the respective transfer stations. A holder carries tools and is displaceable on the frame between the first and second machining stations so that while a workpiece is being machined by one of the tools in one of the machining stations a workpiece can be loaded into or unloaded from the grab of the spindle of the transfer station of the other of the machining stations. A chip deflector has first and second parts movable between respective catch positions underneath the respective first and second machining stations and respective parked positions not underneath the respective first and second machining stations such that, when the first and second parts are in their respective parked positions, the spindles are able to move vertically between the respective machining and transfer stations. A horizontal guide is provided on the frame along which the first and second parts of the chip deflector can travel in a straight line to move between the respective catch and parked positions.

Such a machine is relatively efficient, but the travel path of the workpiece between the work spindles is fairly long and complex.

OBJECTS OF THE INVENTION

It is therefore an object of the present invention to provide an improved machining apparatus.

Another object is the provision of such an improved machining apparatus that overcomes the above-given disadvantages, in particular that has a simple travel path for the workpiece.

SUMMARY OF THE INVENTION

An apparatus for machining a workpiece has according to the invention a housing having a vertical front wall and first and second side walls extending generally perpendicularly back from outer edges of the front wall, directed horizontally oppositely away from each other, and defining respective first and second planes themselves delimiting a space. Respective first and second vertical guides on the first and second side walls outside the housing carry respective first and second vertical slides moveable vertically on the first and second vertical guides of the first and second side walls. Respective first and second horizontal guides on the first and second vertical slides carry respective first and second horizontal slides movable horizontally on the first and second horizontal guides of the first and second vertical slides between respective first and second front work stations and first and second rear transfer stations all lying outside the space defined between the planes. Respective first and second holders for tools are provided in the work stations. The first slide, first spindle, first holder, and first stations are to one side of the space and the second slide, second spindle, second holders and second stations are to an opposite side of the space.

Thus the workpiece moves in a simple U-shaped path around the machine housing for machining in the two work stations. Most of the movement can be done by simple movement of the spindles.

The first and second holders cannot move out of the respective first and second front work stations. They typically each include a rotatable mount for a plurality of tools, some of which may even be powered.

According to the invention a conveyor extends through the rear transfer stations and can move workpieces one after the other into the first rear transfer stations, then from the first rear transfer station to the second transfer station, and then out of the second rear transfer station. This conveyor extends past rear wall of the housing.

In accordance with the invention an inverter between the rear work stations can pick workpieces up off the conveyor, turning them over, and redeposit them on the conveyor upside down.

This apparatus with the conveyor can be operated by first picking a first workpiece up with the first spindle in the first rear transfer station and transporting it horizontally parallel to the first side wall into the first front work station, then machining the first workpiece in the first front work station with one of the tools of the first holder, and finally transporting the first workpiece with the first spindle back to the first rear work station and depositing it on the conveyor. Then the first workpiece is displaced by the conveyor from the first rear work station to the second rear work station where it is picked up by the second spindle and transported horizontally parallel to the second side wall into the second front work station where it is machined with one of the tools of the second holder. Finally it is transported by the second spindle back to the second transfer station.

The steps of picking up, machining, and transporting a second workpiece with the first spindle are carried out while picking up, machining, and transporting the first workpiece with the second spindle.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
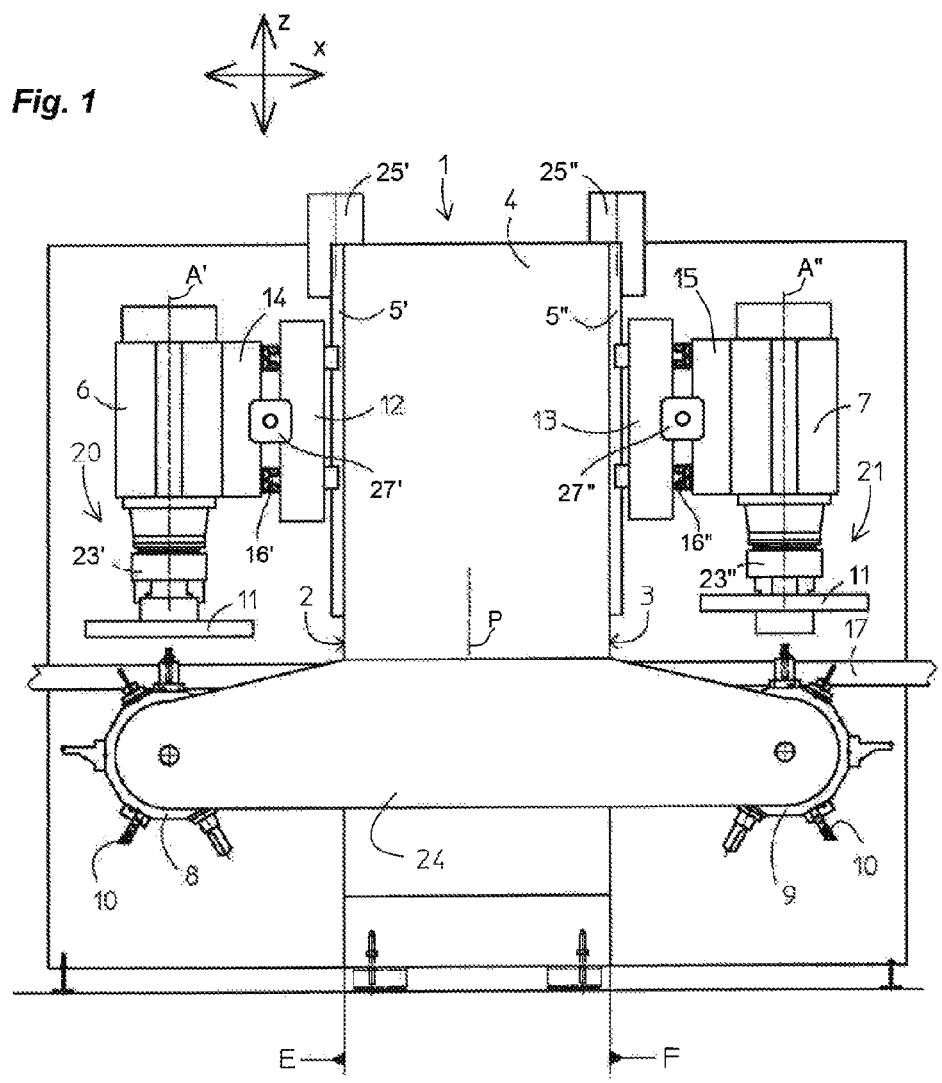
FIG. 1 is a partly schematic front elevational view of the apparatus of this invention.
Figure 2:
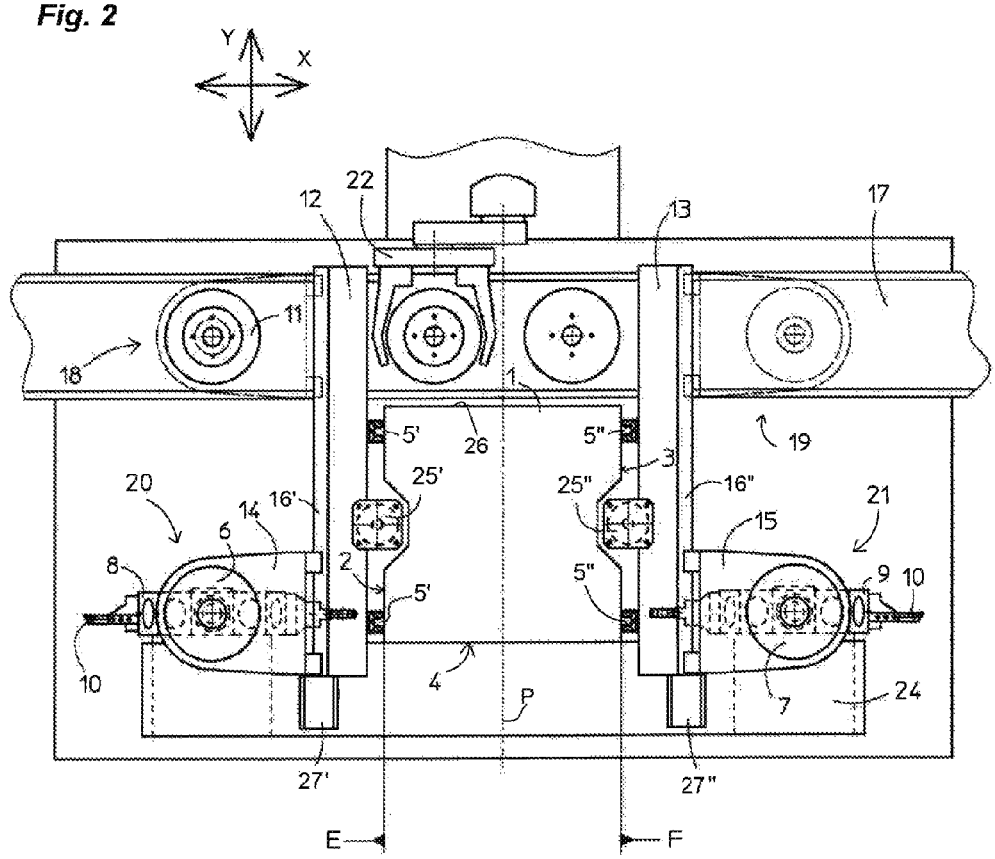
FIG. 2 is a top view of the apparatus.

As seen in FIGS. 1 and 2, a machining apparatus has a columnar housing 1 of essentially square footprint with planar, vertical, and parallel first and second side walls 2 and 3 defining parallel first and second vertical planes E and F and front and back walls 4 and 26 that are also planar, vertical, horizontally spaced, and perpendicular to the side walls 2 and 3. The side walls 2 and 3 carry respective first and second pairs of horizontally spaced but vertical guide rails 5' and 5" on which ride respective first and second vertical slides 12 and 13 that are horizontally elongated and project slightly forward past the front wall 4 and a significantly greater distance, here around four times greater, past the rear wall 26. The vertical slides 12 and 13 can be moved vertically by respective actuators 25' and 25" on the respective side walls 2 and 3 in a vertical direction Z but are horizontally nondisplaceable.

The slides 12 and 13 in turn are provided with respective first and second pairs of vertically spaced and horizontally extending guide rails 16' and 16" on which ride respective first and second horizontal slides 14 and 15 that carry respective first and second spindle drives 6 and 7 of standard construction. The horizontal slides 14 and 15 can therefore be moved horizontally by respective actuators 27' and 27" on the respective vertical slides 12 and 13 in a horizontal direction Y (FIG. 2 only) perpendicular to the vertical direction Z. The spindle drives 6 and 7 carry respective first and second holders or chucks 23' and 23" adapted to pick up and hold workpieces 11, and to rotate the gripped workpieces 11 about respective vertical axes A' and A".

A stationary traverse beam 24 carries first and second turrets 8 and 9 rotatable about respective horizontal axes parallel to the direction Y and each holding a plurality of tools 10 beneath respective first and second front work stations 20 and 21 each spaced outward in a horizontal direction X from the front end region of the respective side walls 2 and 3. This horizontal direction X is perpendicular to the vertical direction A and other horizontal direction Y.

Rearward in the direction Y from the rear wall 26 of the housing 1 is a conveyor 17 that extends in the horizontal direction X past the rear wall 26 of the housing 1 and that passes through first and second rear transfer stations 18 and 19 aligned rearward in the direction Y from the respective front work stations 20 and 21. This conveyor 17 can be a simple belt conveyor and serves to move workpieces 11 into the first rear transfer station 18, then therefrom to the second rear transfer station 19, and thence away therefrom as will be described below. The above-described structure is symmetrical to a plane P parallel to the planes E and F and midway therebetween.

Between the first and second rear transfer stations 18 and 19 is an inverter or flipper 22 capable of picking a workpiece 11 up from the conveyor 17, turning it through 180°, and depositing it back on the conveyor 17 so that, when it gets to the second rear transfer station 19 it is upside-down as compared to its position in the first rear transfer station 18.

The system operates as follows:

Series of workpieces 11 are delivered one after the other in the direction X by stepped operation of the conveyor 17 to the first rear transfer station 18. The first spindle 6 meanwhile is moved to a position directly above the workpiece 11 in the first rear transfer station 18 as shown by dot-dash lines in FIG. 2 and can therefore pick up the workpiece 11 with its grab/chuck 23'.

The spindle 6 then travels forward in the direction Y to the first front work station 20 in which, as is standard, a one of the tools 10 in the first turret 8 is engaged with the workpiece 11 as it and/or the tool 10 are/is rotated, thereby performing a first machining operation on this workpiece 10.

Subsequently the first spindle 6 is moved back to the first rear transfer station 18 where it deposits the partly machined workpiece 10 on the conveyor 17, which then steps the workpiece 10 downstream so that it can be grasped by the inverter 22, turned upside down, and redeposited on the conveyor 17 that, in turns displaces it into the second rear transfer station 19.

The second spindle 7 meanwhile has moved, as the first spindle 6 did before, back into the second rear station 19 to pick up the workpiece 10 and move it into the second front work station 21 where it is machined again, but on the side not worked before in the first station 20.

When this operation is done, the finished workpiece 10 is moved by the second spindle 7 back and deposited in the second rear station 19 onto the conveyor 17 that moves it in the direction X away from the machining apparatus.

The first and second spindles 6 and 7 and inverter 22 as well as the conveyor 17 can all be operating at the same or offset times, so that the machine is kept busy. The travel path of the workpieces is very simple and relatively short, relying on a simple straight-line conveyor and simple straight-line movements of the spindles 6 and 7, so that the only manipulator that is needed is the inverter 22 that flips the workpieces 11. The entire machine can easily be centrally controlled by a computer to mass produce finely machined workpieces, and can be reprogrammed to do a number of tasks, and even to perform a number of different jobs on the workpiece 20 with different tools 10 while in either of the stations 20 or 21.

I claim:

1. An apparatus for machining a workpiece, the apparatus comprising:
   a housing having a vertical front wall, a vertical rear wall, and first and second side walls extending generally perpendicularly back from outer edges of the front wall to outer edges of the rear wall, directed horizontally oppositely away from each other, and defining respective first and second planes themselves delimiting a space;
   respective first and second vertical guides on the first and second side walls and outside the space;
   respective first and second vertical slides moveable vertically on the first and second vertical guides of the first and second side walls outside the space and parallel to the planes of the respective side walls;
   respective first and second horizontal guides on the first and second vertical slides;
   respective first and second horizontal slides movable horizontally on the first and second horizontal guides of the first and second vertical slides between respective first and second front work stations and first and second rear transfer stations and parallel to the planes of the respective first and second side walls, the first and second rear transfer stations being rearward of the front work stations and of the rear wall, the first and second front work and rear transfer stations all lying outside the space defined between the planes;
   respective first and second spindles fixed on the first and second horizontal slides and each capable of holding a workpiece for machining; and
   respective first and second holders for tools in each of the work stations, the first vertical and horizontal slides, first spindle, first holder, and first stations being to one side of the space and the second vertical and horizontal slides, second spindle, second holder and second stations being to an opposite side of the space, the tools in the first and second holders being engageable with the workpieces in the respective first and second spindles when in the respective first and second work stations.

2. The machining apparatus defined in claim 1, wherein the first and second holders cannot move out of the respective first and second front work stations.

3. The machining apparatus defined in claim 1, further comprising:
  a conveyor extending through the rear transfer stations and operable to move workpieces one after the other into the first rear transfer station, then from the first rear transfer station to the second transfer station, and then out of the second rear transfer station.

4. The machining apparatus defined in claim 3, wherein the conveyor extends past the rear wall of the housing.

5. The machining apparatus defined in claim 4, further comprising:
  an inverter between the rear work stations for picking workpieces up off the conveyor, turning them over, and redepositing them on the conveyor upside down.

\* \* \* \* \*